(12) United States Patent
Yeh et al.

(10) Patent No.: US 7,826,221 B2
(45) Date of Patent: Nov. 2, 2010

(54) COMPUTER CHASSIS FOR MOUNTING MOTHERBOARD THEREIN

(75) Inventors: Chin-Wen Yeh, Taipei Hsien (TW); Zhen-Neng Lin, Shenzhen (CN)

(73) Assignees: Hong Fun Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/481,054

(22) Filed: Jun. 9, 2009

(65) Prior Publication Data

US 2010/0097756 A1    Apr. 22, 2010

(30) Foreign Application Priority Data

Oct. 16, 2008    (CN) .................. 2008 2 0302438

(51) Int. Cl.
*H05K 5/00* (2006.01)
*H05K 7/00* (2006.01)
(52) U.S. Cl. ............................ 361/679.58; 361/679.6
(58) Field of Classification Search ............ 361/679.02, 361/679.58, 679.6
See application file for complete search history.

(56) References Cited

U.S. PATENT DOCUMENTS

| | | | |
|---|---|---|---|
| 6,937,476 B1 * | 8/2005 | Chen et al. ................. | 361/756 |
| 7,342,809 B2 * | 3/2008 | Chen et al. ................. | 361/801 |
| 2009/0231817 A1 * | 9/2009 | Xue .......................... | 361/759 |

* cited by examiner

*Primary Examiner*—Jayprakash N Gandhi
*Assistant Examiner*—Anthony M Haughton
(74) *Attorney, Agent, or Firm*—D. Austin Bonderer

(57) ABSTRACT

An apparatus includes a computer chassis and a motherboard. The motherboard defines a rotating hole, a clasp hole, and a through hole. The clasp hole has a clasp slot and an arcuate groove. The computer chassis includes a bottom plate, and a first, second, and third convex projections. A rotating shaft is formed on the first convex projection. A mounting hole is defined in the second convex projection. A clasp is formed on the third convex projection. The clasp includes a root connected with the third convex projection, and a bent portion. The motherboard is rotatable between a first and a second position. In the first position, the rotating shaft of the first convex projection is inserted in the rotating hole, and the bent portion of the clasp extends through the clasp slot. In the second position, the root of the clasp is located in the arcuate groove, and the though hole of the motherboard is aligned with the mounting hole of the second convex projection.

9 Claims, 3 Drawing Sheets

COMPUTER CHASSIS FOR MOUNTING MOTHERBOARD THEREIN

BACKGROUND

1. Technical Field

The present embodiment relates to computer chassis, and particularly to a computer chassis that conveniently mounts a motherboard therein.

2. Description of Related Art

Conventionally, a motherboard is mounted to a computer chassis with fasteners, such as screws or bolts. However, when installing or removing the motherboard, a tool such as a screwdriver or a wrench is usually required, and tightening or removing the fasteners is laborious and time-consuming.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
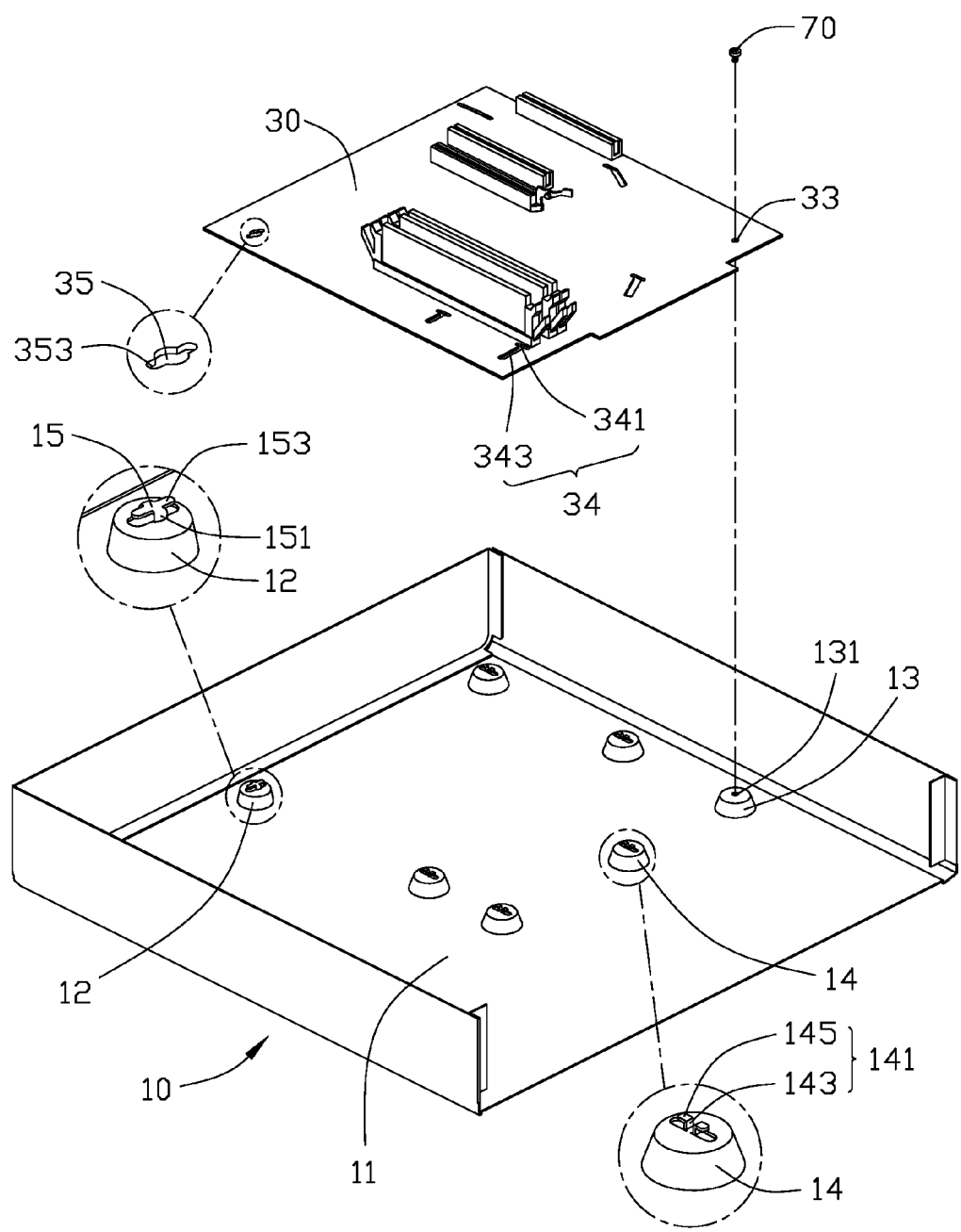
FIG. 1 is an exploded, isometric view of an embodiment of a computer chassis which includes a motherboard.

Referring to FIG. 1, a mounting apparatus is used to mount a motherboard 30 to a computer chassis 10.

The chassis 10 includes a bottom plate 11. The bottom plate 11 has a first convex projection 12, a second convex projection 13, and a plurality of third convex projections 14 protruded therefrom. These convex projections 12, 13, and 14 can be arranged in a rectangular shape. The first convex projection 12 and the second convex projection 13 are located at diagonal positions of the rectangular shape. A rotating shaft 15 is formed on the first convex projection 12. The rotating shaft 15 includes a pair of short legs 151 connected with the first convex projection 12, and a pair of long legs 153 located above the first convex projection 12. The pair of long legs 153 extends in a first direction, which is parallel to the bottom plate 11.

The second convex projection 13 defines a mounting hole 131. The third convex projection 14 forms a pair of clasps 141 thereon. Each clasp 141 includes a vertical root 143 standing on the third convex projection 14, and a horizontal bent portion 145 formed from the top end of the root 143. The two bent portions 145 of the pair of clasps 141 extend away from each other and parallel to the bottom plate 11.

The motherboard 30 defines a rotating hole 35 corresponding to the rotating shaft 15 of the chassis 10. A diameter of the rotating hole 35 is larger than a distance between the two short legs 151 of the rotating shaft 15. A pair of shaft slots 353 are defined on the motherboard 30, and communicate with the rotating hole 25 for receiving the two long legs 153 extending therethrough. The motherboard 30 defines a through hole 33 corresponding to the mounting hole 131 of the chassis 10. The motherboard 30 defines a plurality of clasp holes 34 corresponding to the plurality of clasps 141 of the chassis 10. Each clasp hole 34 includes a clasp slot 341 for receiving the bent portions 145 of the clasp 141 extending through, and an arcuate groove 343 for receiving the roots 143 of the clasp 141 sliding therein. The arcuate groove 343 communicates with the clasp slot 341. A circular center of the arcuate groove 343 is positioned in the rotating hole 35.

Figure 2:
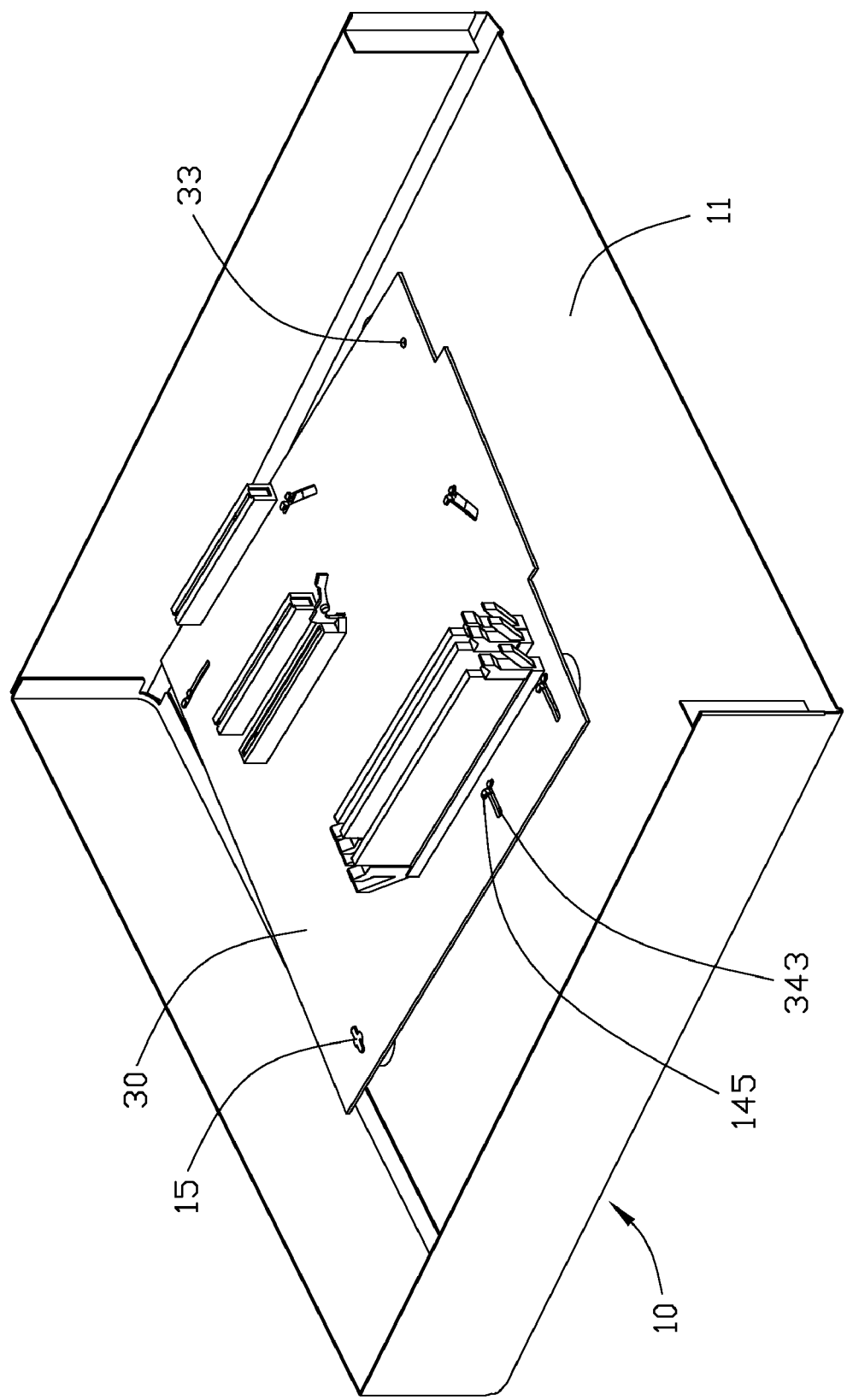
FIG. 2 is a part-assembled view of the computer chassis and the motherboard of claim 1.
Figure 3:
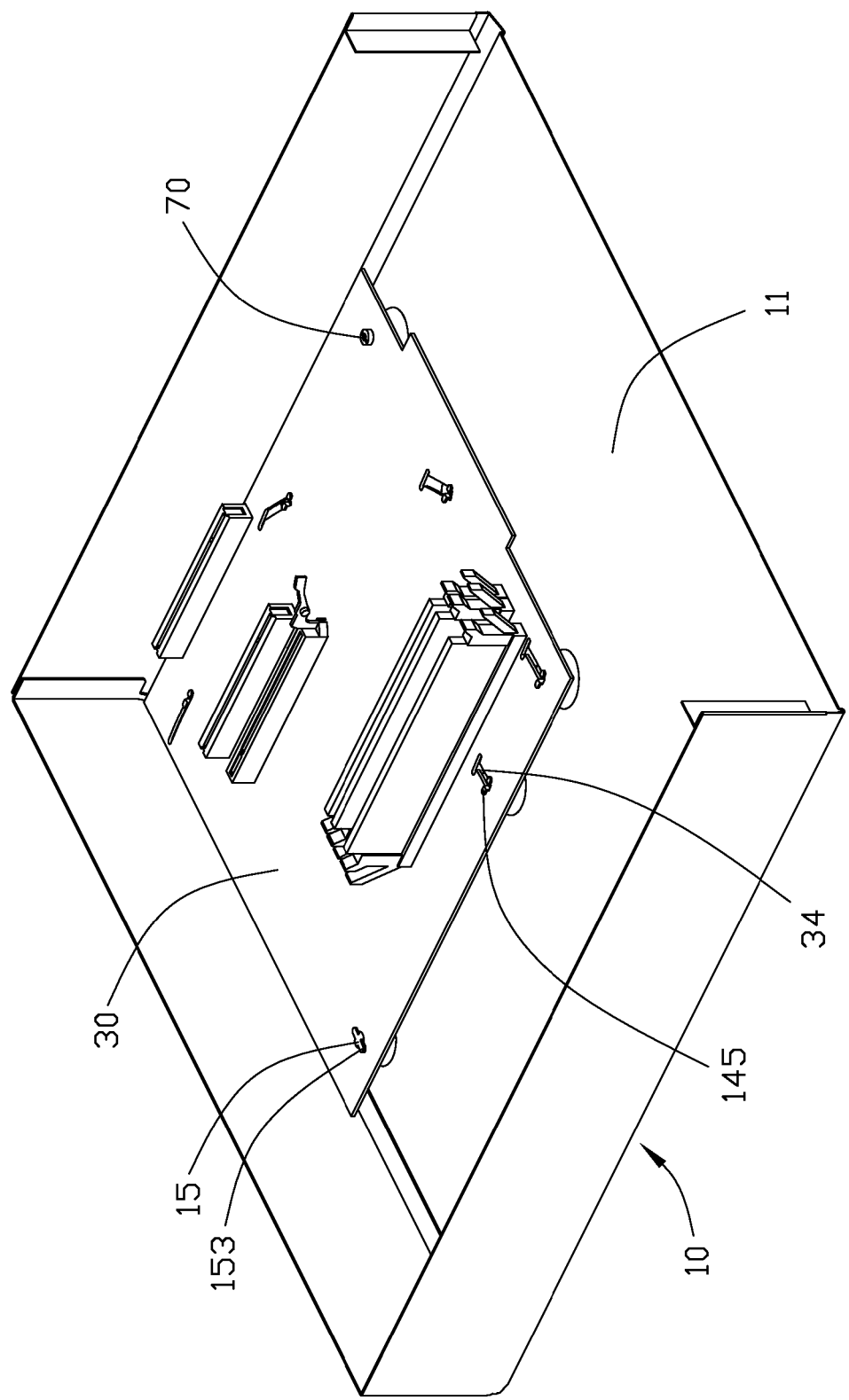
FIG. 3 is assembled view of the computer chassis and the motherboard of claim 1.

Referring to FIGS. 2 and 3, in assembly of the motherboard 30 on the chassis 10, the rotating hole 35 is aligned with the rotating shaft 15 of the chassis 10, and each clasp slot 341 is aligned with corresponding clasp 141 of the chassis 10. The two long legs 153 of the rotating shaft 15 extend through the shaft slots 353 of the motherboard 30 while the two short legs 151 remain in the rotating hole 35. Simultaneously, the bent portions 145 of the clasp 141 extend through the clasp slot 341 of the motherboard 30 to remain the roots 143 of the clasps 141 in the clasp slot 341. At this position, the roots 143 are in alignment with the arcuate groove 343. The motherboard 30 is supported on the convex projections 12, 13, and 14. Then, the motherboard 30 rotates about the rotating shaft 15 on the convex projections 12, 13, and 14. The roots 143 of the clasp 141 slide in the arcuate grooves 43 of the motherboard 30 until the mounting hole 131 of the chassis 10 is aligned with the through hole 33 of the motherboard 30. The long legs 153 of the rotating shaft 15 are misaligned with the shaft slots 353, and the bent portions 145 of the clasp 141 are misaligned with the clasp slot 341 to restrict the motherboard 10 on the first and third convex projections. At last, a fastener 70 extends through the through hole 33, and is fastened in the mounting hole 131 of the second convex projection 13 to mount the motherboard 30 on the chassis 10.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An apparatus comprising:

a motherboard defining a rotating hole, a clasp hole, and a through hole, the clasp hole comprising a clasp slot and an arcuate groove communicating with clasp slot; and a computer chassis comprising:

a bottom plate;

a first convex projection formed on the bottom plate, a rotating shaft formed on the first convex projection;

a second convex projection formed on the bottom plate, a mounting hole defined in the second convex projection; and a third convex projection formed on the bottom plate, a clasp formed on the third convex projection, the clasp comprising a root connected with the third convex projection, and a bent portion formed on a free end of the root;

wherein the motherboard is rotatable between a first and a second position, in the first position the motherboard is located on the first, second, and third convex projections, the rotating shaft of the first convex projection is located in the rotating hole, the bent portion of the clasp extends through the clasp slot with the root remained in the clasp slot and aligned with the arcuate groove; in the second position the root of the clasp is located in the arcuate groove, the bent portion of the clasp is misaligned with the clasp slot to restrict the motherboard on the third convex projection, the though hole of the motherboard is aligned with the mounting hole of the second convex projection.

2. The apparatus of claim 1, wherein the rotating shaft comprises a short leg and a long leg, the short leg is connected with the first convex projection, a shaft slot is defined in the motherboard to communicate with the rotating hole, the long leg of the rotating shaft extends through the shaft slot to retain the short leg in the rotating hole in the first position, the long leg of the rotating shaft is misaligned with the shaft slot to restrict the motherboard on the first convex projection in the second position.

3. The apparatus of claim 2, wherein the long leg and the bent portion are parallel to the bottom plate.

4. The apparatus of claim 1, wherein a circular center of the arcuate groove is positioned at the rotating hole.

5. The apparatus of claim 1, wherein the first and the second convex projections are positioned on the bottom board corresponding to a pair of diagonal positions of a rectangular shape.

6. An apparatus, comprising:
a motherboard defining a rotating hole and a clasp hole, and a shaft slot communicating with the rotating hole, the clasp hole comprising a clasp slot and an arcuate groove communicating with second slot; and
a computer chassis comprising:
a bottom plate;
a first convex projection formed on the bottom plate, a rotating shaft formed on the first convex projection, the rotating shaft comprising a short leg and a long leg, the shot leg connected with the first convex projection, the long leg extending in a first direction which is parallel to the bottom plate;
a third convex projection formed on the bottom plate, a clasp formed on the third convex projection, the clasp comprising a root connected with the third convex projection, and a bent portion formed on a free end of the root, the bent portion being parallel to the bottom plate; and
wherein the motherboard is rotatable between a first and a second position, in the first position the motherboard is located on the first and third convex projections, the long leg of the rotating shaft extends through the shaft slot to remain the short leg in the rotating hole, the bent portion of the clasp extends through the clasp slot with the root remained in the clasp slot and aligned with the arcuate groove; and in the second position the root of the clasp located in the arcuate groove, the long leg of the rotating shaft is misaligned with the shaft slot, and the bent portion of the clasp is misaligned with the clasp slot to restrict the motherboard on the first and third convex projections.

7. The apparatus of claim 6, wherein a second convex projection is formed on the bottom plate, a mounting hole is defined in the second convex projection, the motherboard defines a through hole being capable of aligned with the mounting hole in the second position.

8. The apparatus of claim 7, wherein the first and the second convex projections are positioned on the bottom board corresponding to a pair of diagonal positions of a rectangular shape.

9. The apparatus of claim 7, wherein a circular center of the arcuate groove is positioned at the rotating hole.

* * * * *

UNITED STATES PATENT AND TRADEMARK OFFICE
CERTIFICATE OF CORRECTION

PATENT NO. : 7,826,221 B2  
APPLICATION NO. : 12/481054  
DATED : November 2, 2010  
INVENTOR(S) : Chin-Wen Yeh and Zhen-Neng Lin Page 1 of 1

It is certified that error appears in the above-identified patent and that said Letters Patent is hereby corrected as shown below:

Title Page, Item (73) should read as follows:

-- (73) Assignees: Hong Fu Jin Precision Industry (ShenZhen) Co., Ltd., Shenzhen, Guangdong Province (CN); Hon Hai Precision Industry Co. Ltd., Tu-Cheng, Taipei Hsien (TW). --.

Signed and Sealed this  
Eighth Day of February, 2011

David J. Kappos  
*Director of the United States Patent and Trademark Office*